United States Patent Office 2,986,614
Patented May 30, 1961

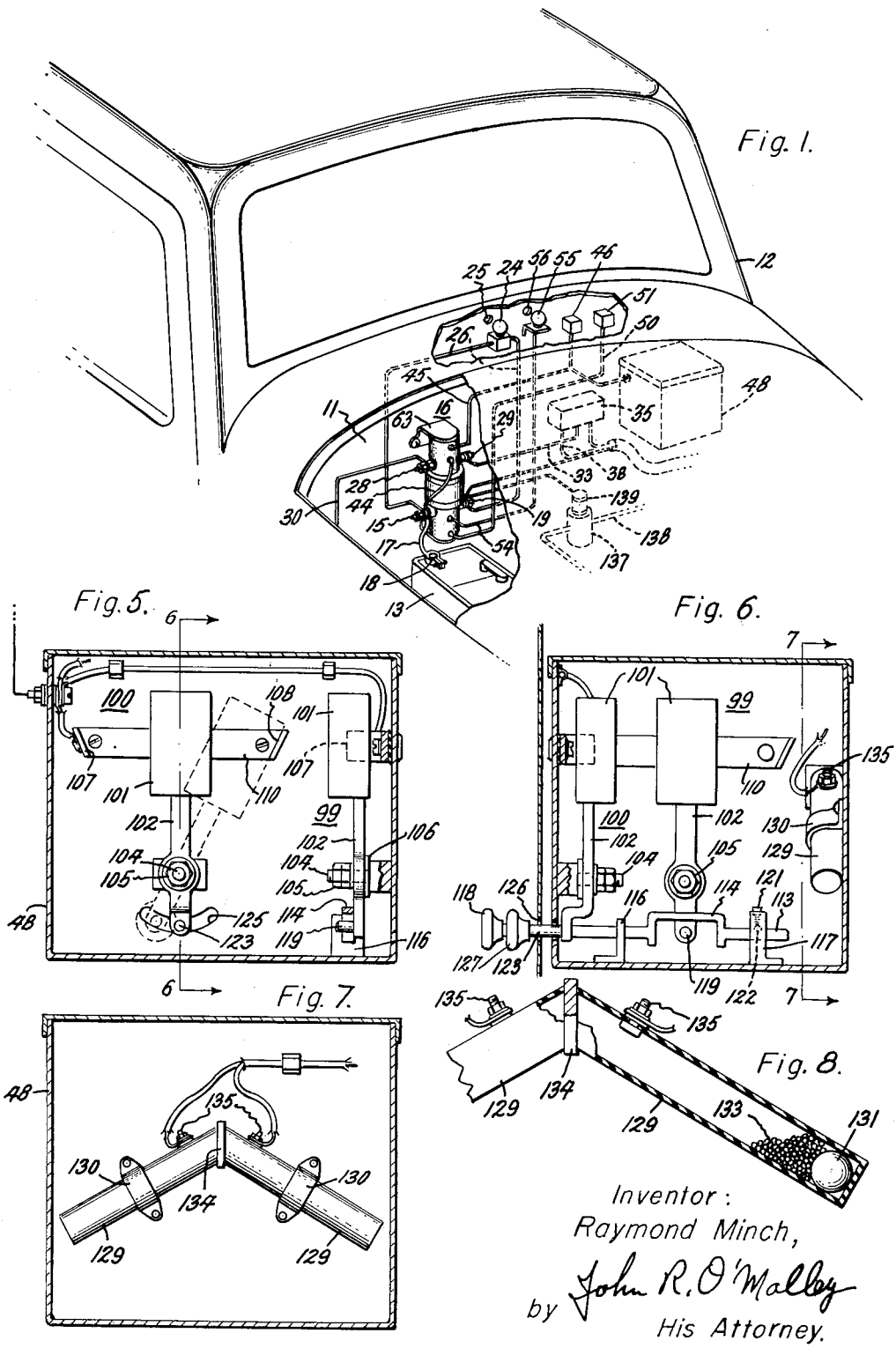

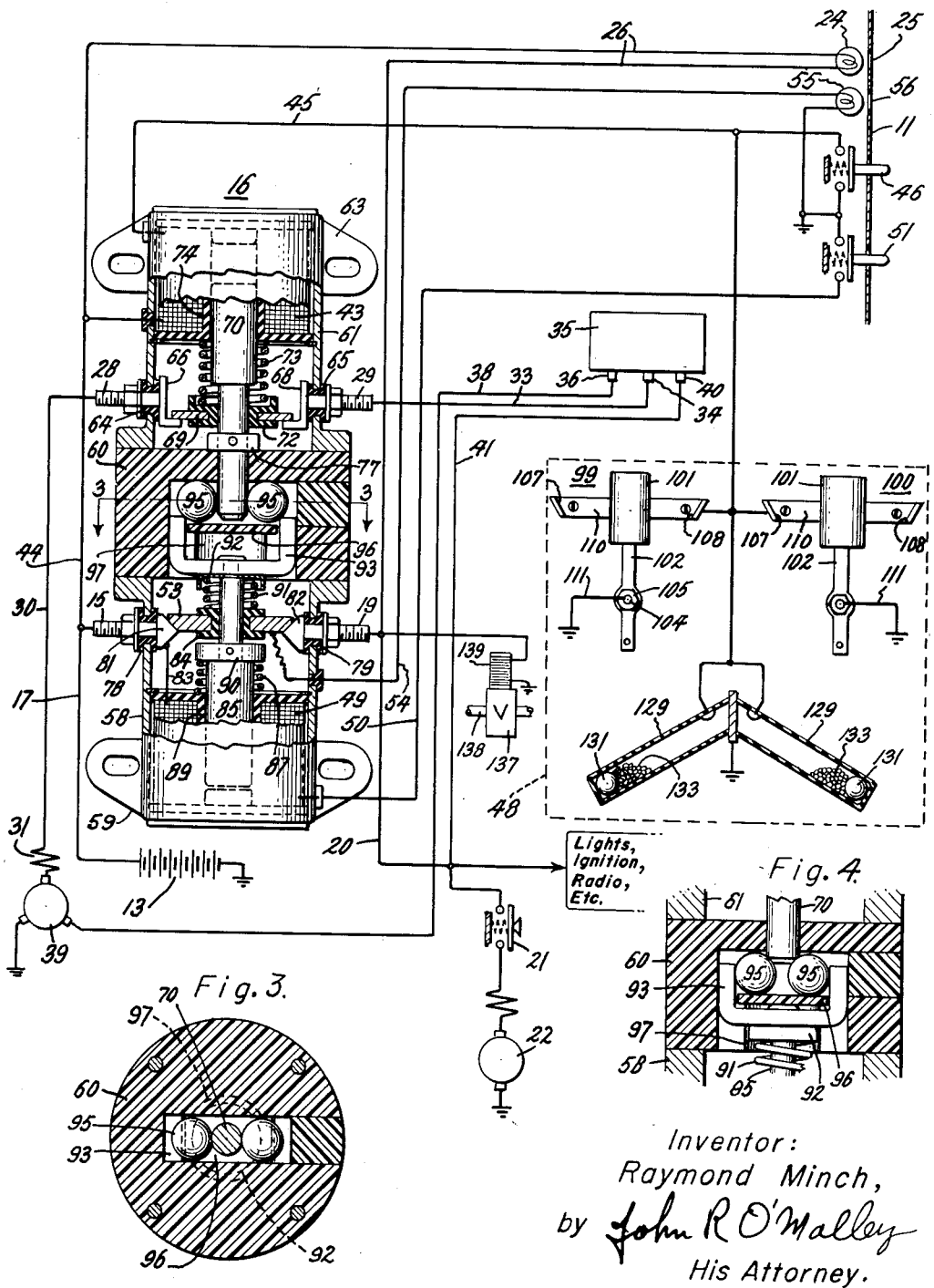

2,986,614

AUTOMATIC SAFETY CUTOUT SWITCH SYSTEM FOR USE IN A MOTOR VEHICLE

Raymond Minch, Stop 28, Troy-Schenectady Road, Schenectady, N.Y.

Filed June 24, 1958, Ser. No. 744,181

1 Claim. (Cl. 200—61.5)

The present invention relates to a switch system for automatically disconnecting a storage battery and the field circuit of a charging generator from other components of an electrical system.

When a vehicle is subject to a sudden impact as, for example, when struck by another vehicle, or is turned over, fuel which leaks may be ignited by an energized electrical system to cause serious damage. Many vehicles do not have electrical systems that can be quickly and conveniently deenergized in case of an accident, and even in those that do, the vehicle operator may suffer such injuries from an accident that he is not physically capable of operating the switches that deenergize the electrical system.

Accordingly, an object of the present invention is to provide a system that can be quickly and conveniently operated to deenergize an electrical system.

Still another object is to provide a system that automatically deenergizes an electrical system when subject to impact beyond a predetermined magnitude.

A further object of the present invention is to provide a system that automatically deenergizes an electrical system when tilted beyond a predetermined angle.

These and other objects are achieved in one embodiment of my invention which is mounted on a vehicle and which has an impact and turnover sensing mechanism that completes a circuit to a coil in a safety cutout switch when the vehicle turns over or is subjected to an impact beyond a predetermined magnitude. The safety cutout switch then opens the circuits from the ungrounded terminal of the storage battery and the generator field winding to the vehicle electrical system.

The novel features believed characteristic of the invention are set forth in the appended claim. The invention itself, together with further objects and advantages thereof, may best be understood by reference to the following description, taken in connection with the accompanying drawings, in which:

Fig. 1 is a diagrammatic view of one embodiment of the present invention applied to the electrical system of a vehicle, Fig. 2 is a diagrammatic illustration of one embodiment of my invention in which some of the system components are illustrated in detail, Fig. 3 is a cross-sectional view taken along the lines 3—3 of Fig. 2, Fig. 4 is a cross-sectional view of a portion of the cutout switch of Fig. 2 illustrated in the "off" position, Fig. 5 is a cross-sectional view of the housing for the impact and turnover sensing mechanism of the system of Fig. 2, Fig. 6 is a cross-sectional view taken along the lines 6—6 of Fig. 5, Fig. 7 is a cross-sectional view taken along the lines 7—7 of Fig. 6, Fig. 8 is an enlarged partially-sectioned view of a portion of one of the system components.

As illustrated in Fig. 1, my automatic safety cutout switch system may be readily mounted on the wall 11 between the engine and driver's compartments of a vehicle 12, such as an automobile or truck, and interconnected to readily isolate a storage battery 13 from the vehicle electrical system. One terminal 15 of a cutout switch 16 is interconnected by a relatively short cable 17 with the ungrounded terminal 18 of battery 13, while the opposite terminal 19 is connected through a cable or conductor 20 to the usual starter switch 21 for the engine starting motor 22, as illustrated diagrammatically in Fig. 2. A lamp 24, positioned to shine light through a hole 25 in wall 11, is connected by conductors 26 across terminals 15 and 19 to produce an indicating light upon the occurrence of a short circuit in the electrical system after the cutout switch 16 has been opened. Lamp 24 also limits the magnitude of the short circuit current.

An upper pair of switch terminals 28 and 29 are connected by a conductor 30 into the circuit of the generator field winding 31, illustrated in Fig. 2, and by a conductor 33, in accordance with the usual practice, to the middle terminal 34 of a voltage regulator and protective relay 35, which may be of the usual type. One of the other regulator terminals 36 is connected by a conductor 38 to the usual automobile generator 39, and the third terminal 40 is connected by a conductor 41 to the conductor 20.

As is illustrated in Fig. 2, switch 16 has a field circuit switch armature coil 43 connected at one end terminal by a short conductor 44 to switch terminal 15 and at the other end terminal by a lead 45 to the ungrounded side of a remote operating switch 46 and also to a housing 48, shown diagrammatically in Figs. 1 and 2, containing the impact and turnover switch mechanisms. Switch 16 also has a battery circuit switch armature coil 49 with an end joined by a conductor 50 to the ungrounded side of a remote operating switch 51 that when operated completes a ground circuit to coil 49. The battery circuit interrupting switch member 53 of switch 16 is connected by a conductor 54 to the ungrounded side of a lamp 55 which is positioned to shine light through a hole 56 in wall 11 to indicate that the battery and generator field circuits are completed.

The cutout switch 16 of Fig. 2 is provided with a lower enclosing frame 58 mounted by a bracket 59 to wall 11, a middle frame 60 constructed from a shock absorbing material such as rubber, and an upper frame 61 mounted by a bracket 63 to wall 11. The oppositely-positioned terminals 28 and 29, which are mounted in frame 61 by insulated bushings 64 and 65, are respectively provided with L-shaped field circuit terminal heads 66 and 68 for engagement with the movable field circuit interrupting switch member 69. Member 69 is slidably mounted upon a reciprocating operating field circuit switch armature 70 by a suitable insulating bushing 72 having a cup-shaped upper surface from which a spring 73 extends to an insulating sleeve 74 around field circuit switch armature coil 43 to press member 69 in tight contact engagement with heads 66 and 68. At the upper end, armature 70 is engaged with magnetic material that coacts with the magnetic field from coil 43, when this coil is energized, to produce an upward force on armature 70 greater than the downward force of spring 73 on member 69, thereby causing armature 70 to move upwards, and when a locked collar 77 thereon engages bushing 72, to cause field circuit interrupting switch member 69 to disengage from heads 66 and 68, and thereby to open the generator field winding circuit.

In the lower frame member 58 the terminals 15 and 19, which are oppositely mounted by insulated bushings 78 and 79, are provided with oppositely aligned enlarged battery circuit terminal heads 81 and 82 for circuit closing engagement with the movable battery interrupting switch member 53. Since the current in the battery circuit is much greater than that in the field circuit and hence much greater contact pressure is required, the terminal heads 81 and 82 are tapered to provide for a high contact pressure wedging engagement. A conductor 83 is provided to connect terminal head 81 to coil 49.

Battery circuit interrupting switch member 53 is slidably mounted by insulated bushing 84 on a reciprocating operating battery switch armature 85 which has an enlarged lower end of magnetic material for coacting with a magnetic field from coil 49 to draw armature 85 downward against the upward forces of a biasing spring 87, extending between an insulating sleeve 89 around coil 49 and a collar 90 locked on armature 85, and another biasing spring 91 extending between bushing 84 and a cup-shaped extension 92 of the upper U-shaped end or yoke 93 of armature 85.

The upward movement of armature 85 is controlled by locking means illustrated as two balls 95 positioned in a rectangular opening between a transverse platform 96, suitably fixed to middle frame 60, and the top of frame member 60. These balls 95 are separated by armature 70 when it is in a down position, as illustrated in Figs. 2 and 3, to engage the edges of yoke 93 thereby preventing upward movement of armature 85. But when armature 70 is in the up position, as is illustrated in Fig. 4, balls 95 are constrained by the edges of yoke 93 to move radially inward thereby disengaging yoke 93 and permitting armature 85 to move upwards. Frame member 60 has a circular groove 97 which is required for clearance of cup-shaped extension 92 upon the upward movement of cup-shaped extension 92. When armature 85 raises, collar 90 engages bushing 84 to lift member 53 from engagement with terminal heads 81 and 82, thereby opening the battery circuit.

The automatic impact and turnover sensing mechanisms in housing 48, illustrated in Figs. 2, 5, 6, 7 and 8 comprise perpendicularly-related front and rear, and side impact members 99 and 100, respectively, both of which include a weight 101 mounted on an arm 102 having an adjustable frictional pivot including a bolt 104, nuts 105, and a frictional washer 106. This pivot permits weights 101 to move in an arc to contact either the left or right ears 107, 108 on the ends of conductor strips 110, depending upon which side of the vehicle 12 receives an impact beyond a magnitude determined by the setting of the frictional pivots. Two conductors 111 place weights 101 at ground potential so that when they make contact with ears 107 or 109, they complete a circuit to ground for the conductor 45.

Impact member 99 can be reset to the center position, after striking one of the ears 107 or 108, by a rod 113 of rectangular cross-section, illustrated in Fig. 6, having a U-shaped middle portion 114. Rod 113, which is slidably engaged in guide members 116 and 117, can be moved by means of a knob 118, mounted on the end of rod 113 on the driver's side of wall 11, such that one side or the other of U-shaped portion 114 engages a pin 119 on impact member 99. Members 116 and 117 are so placed that when one of them is in contact with an exterior side of U-shaped portion 114, the impact member 99 is centered by one of the interior sides. After the reset operation, rod 113 should be centered by a pushing or pulling operation until a spring-loaded detent 121 rests in a groove or notch 112 in rod 113.

Impact member 100 is reset by a rod 123 extending through an arcuate slot 125 in housing 48 and a similar slot 126 in wall 11. On the end of rod 123 in the driver's compartment, an operating knob 127 is mounted so that impact member 100 can be centered by movement of knob 127 to the bottom portion of the arcuate slot 125.

In an alternative arrangement for impact members 99 and 100, not shown, weights 101 may be arranged to hang downward so that the force of gravity aids in their centering.

The turnover mechanism, as illustrated in Figs. 2, 7 and 8, comprises a housing of two tubes 129 of insulating material secured by clamps 130 to housing 48. Each tube contains a large rollable weight 131 of diameter approximately that of tubes 129, that are positioned under a large number of small balls 133 or shot of conducting material. These tubes 129 are butted against a disk 134 of grounded conducting material at an angle of approximately 30° with the horizontal. Consequently, the normal positions for weights 131 and balls 133 are at the low ends of tubes 129, as illustrated in Figs. 2 and 8. Each tube 129 is provided with an individual terminal 135 positioned such that if the vehicle 12 turns over, the shot 133 in one of the tubes 129 are driven by the weight 131 underneath into contact with the terminal 135 and disk 134 to complete a circuit to ground for conductor 45.

Tubes 129 are mounted to extend horizontally across the vehicle 12 since it will most likely turn over on its side. With these tubes 129 at approximately 30° from the horizontal, one of the tubes will slant downward at an angle of 15° when the vehicle 12 turns over, which will occur when it has tipped beyond 45°. This 15° is sufficient downgrade for the rollable weight 131 in the downward slanted tube to force the shot 133 between a terminal 135 and disk 134 to complete a ground circuit for wire 45.

If it were not for the dampening action of shot 133, the weights 131 might bounce up to make contact between terminal 135 and disk 134 when the vehicle 12 is not turning over but merely going over a rough road. On the other hand, shot 133, alone, may not have sufficient mass to impel them to make good contact between terminals 135 and disk 134 if weights 131 are not behind them. Thus, both shot 133 and weights 131 are preferably used. The shot 133 have a dampening effect resisting the propelling effect of the larger weights 131 because the shot 133 have more frictional surface contact with the tube 129 and with one another.

In the operation of the system, whenever a circuit from wire 45 is completed to ground either by the operator pressing remote operating switch 46 or by one of the weights 101 contacting ear 107 or 108 or by some shot 133 completing the circuit from a terminal 135 to disk 134, current flows from battery 13 through upper coil 43 to wire 45 back to ground. The magnetic field produced by the current flow through coil 43 lifts armature 70 by solenoid action, and thus also collar 77 which then makes contact with member 69, lifting this member against the pressure of spring 73 thereby opening the circuit for the field winding 31 of generator 39. Also, the lifting of armature 70 permits balls 95 to be forced together under the pressure of yoke 93 thereby permitting armature 85 to lift under the force of spring 87 on collar 90. When collar 90 contacts bushing 84, member 53 clears from heads 81 and 82 thereby opening the battery circuit. Thus, the electric circuit is completely deenergized whenever the vehicle turns over, is subject to a severe impact, or whenever the operator presses switch 46. Of course, the opening of the battery circuit also opens the circuit to lamp 55 thereby extinguishing it, to provide an indication to the operator that the cutout switch 16 has opened the electrical circuit. The opening of the battery circuit can also be utilized in a gas vehicle for closing a valve 137 in a gas line 138 that is normally maintained open by an energized solenoid 139, which is, of course, deenergized when the battery circuit opens.

Since the opening of the battery circuit removes the short circuit across lamp 24, a subsequent short circuit occurring in the electrical system completes an energizing circuit for lighting lamp 24, which then provides an indication to the operator that the electrical system has a short circuit.

The ground circuit to wire 45 does not have to be maintained for the cutout switch 16 to remain open, for once armature 70 is raised, balls 95, which are maintained together by yoke 93, prevent armature 70 from lowering under the pressure of spring 73. Of course, armature 85 does not lower since it is being maintained in an upward position by spring 87.

In order to close the cutout switch 16, the operator presses remote operating switch 51 which completes a circuit to ground from battery 13 through battery switch armature coil 49 thereby producing a force on armature 85 by solenoid action causing it to be lowered against the force of spring 87. This permits the bevelled edge of the lower end of armature 70 to force balls 95 outward thereby locking armature 85 in the downward position and permitting armature 70 to lower under the forces of spring 73 and of gravity. Of course, when armatures 70 and 85 lower, the generator field circuit and the battery circuit are completed.

Of course, in the embodiment of Fig. 2 the battery and generator field winding circuit switches can be interchanged such that armature 70 opens the battery circuit and armature 85 the field winding circuit. But the large terminal heads 81 and 82 should always be in the battery circuit since it carries so much more current than the field winding circuit.

Although I have described my invention in relation to a vehicle environment, it should be apparent that it has other utility as, for example, in controlling the electrical system of a boat.

While the invention has been described with respect to certain specific embodiment, it will be appreciated that many modifications and changes may be made by those skilled in the art without departing from the spirit of the invention. I intend, therefore, by the appended claim, to cover all such modifications and changes as fall within the true spirit and scope of the invention.

What I claim as new and desire to secure by Letters Patent of the United States is:

A safety cutout switch for utilization in an automatic safety cutout switch system, comprising a first pair of spaced terminal heads, a first circuit interrupting switch member for completing a circuit between said first pair of spaced terminal heads, a spring for biasing said first circuit interrupting switch member in pressure engagement against said first pair of spaced terminal heads, a first armature for engaging said first circuit interrupting switch member for disengaging said first circuit interrupting switch member from said first pair of spaced terminal heads when in a first position and for disengaging from said first circuit interrupting switch member when in a second position, a spring for biasing said first armature to said first position, a first armature coil upon energization for producing a magnetic field for moving said first armature to said second position, a second pair of spaced terminal heads, a second circuit interrupting switch member for completing a circuit between said two second pair of spaced terminal heads, a spring for biasing said second circuit interrupting switch member in pressure engagement against said second pair of spaced terminal heads, a second armature for engaging said second circuit interrupting switch member for disengaging said second circuit interrupting switch member from said second pair of spaced terminal heads when in a first position and for disengaging from said second circuit interrupting switch member when in a second position, a second armature coil when energized for moving said second armature to said first position, and means for locking said first armature in said second position when said second armature is in said second position.

References Cited in the file of this patent

UNITED STATES PATENTS

| | | |
|---|---|---|
| 1,719,742 | Adams | July 2, 1929 |
| 1,761,681 | Reis et al. | June 3, 1930 |
| 1,890,233 | Phillips | Dec. 6, 1932 |
| 1,956,484 | Bate | Apr. 24, 1934 |
| 2,027,709 | Slebos | Jan. 14, 1936 |
| 2,156,946 | Closson et al. | May 2, 1939 |
| 2,171,457 | Schuyler | Aug. 29, 1939 |
| 2,198,677 | Mueller | Apr. 30, 1940 |
| 2,236,872 | Grigsby | Apr. 1, 1941 |
| 2,273,058 | Miller | Feb. 17, 1942 |
| 2,304,608 | Smythe | Dec. 8, 1942 |